BINARY 180° DIODE PHASE MODULATOR

Filed Dec. 7, 1964 2 Sheets-Sheet 1

INVENTOR,
ROBERT V. GARVER

BY Harry M. Saragovitz
Edward J. Kelly Herbert Berl
& Charles L. Whitham
ATTORNEYS

INVENTOR.
ROBERT V. GARVER

BY Harry M. Saragovitz,
Edward J. Kelly, Herbert Berl
& Charles S. Whitham ATTORNEYS United States Patent Office 3,349,342

Patented Oct. 24, 1967

3,349,342

BINARY 180° DIODE PHASE MODULATOR

Robert V. Garver, Rockville, Md., assignor to the United States of America as represented by the Secretary of the Army Filed Dec. 7, 1964, Ser. No. 416,659
4 Claims. (Cl. 332—9)

ABSTRACT OF THE DISCLOSURE

A broad band reciprocal microwave binary phase modulator that allows extremely fast switching between 0° and 180° phase shift. Two equal length rectangular wave guides are coupled to the input signal by an H-plane "T" network, and an E-plane "T" network couples the signals to the output circuitry. A diode switch is connected in each wave guide at points distant from the H-plane "T" junction an integral number of half-wavelengths. The diode switches are connected to a suitable source of modulation signals to cause one or the other to conduct.

The invention described herein may be manufactured and used by or for the Government of the United States of America for governmental purposes without the payment to me of any royalty thereon.

This invention relates generally to phase modulators, and more particularly to a broad band reciprocal microwave binary phase modulator having particular application in pulse code modulation systems.

Of the several types of modulation employed in information transmission systems, pulse code modulation offers several important advantages. For example, in communication systems bandwidth is made independent of frequency and is a function of time only when pulse modulation is used. This is an especially important advantage at very high microwave frequencies where components and circuitry tend to be inherently narrow band devices. Even at lower frequencies where bandwidth is less critical, pulse code modulation communication systems are uniquely compatible with digital computer and data processing facilities and, as a result, are being used as transmission links between such facilities. In addition to applications in communication systems, pulse code modulation is being used in certain radar systems. These radar systems have the important military advantage of being less susceptible to electronic counter measures.

The heart of any modulation system is, of course, the modulator. Pulse code modulation may be obtained by discretely varying any one or a combination of the carrier signal parameters; however, phase modulation permits simpler transmitter design since power and bandwidth requirements are minimized. At the same time, phase modulation provides good signal-to-noise ratio characteristics. Prior attempts to devise binary phase shifting circuitry at very high microwave frequencies, such as X band, have been unsatisfactory. These attempts have generally resulted in complex, bulky structures which required high modulation power to produce the desired phase shifts. In addition, most prior microwave binary phase shift circuits have been capable of handling only low power signals and have exhibited undesirably slow speed operation. Many prior binary phase modulators exhibit unacceptably high insertion losses.

It is therefore an object of the present invention to provide a reciprocal microwave phase shifter that can be switched between 0° and 180° phase shift in an extremely short time on the order of twenty nanoseconds or less.

It is another object of this invention to provide a reciprocal binary phase modulator for microwave frequencies which is extremely simple in construction permitting miniaturization of the structure and substantial reductions in fabrication costs.

It is a further object of the instant invention to provide a reciprocal microwave binary phase modulator capable of bandling high input signal power while at the same time requiring low modulation power to produce the desired phase shift.

It is yet another object of the immediate invention to provide a reciprocal microwave phase shift circuit for use in pulse code modulation systems which has a negligible insertion loss.

According to the present invention, the foregoing and other objects are attained by providing two rectangular wave guides each equal in length to an integral number of wavelengths of the carrier signal. The two wave guides are coupled to the input signal by an H-plane T network, and an E-plane T network couples the signals in the two wave guides to the output circuitry. A diode switch is connected in each wave guide at points distant from the H-plane T junction an integral number of half wavelengths. The diode switches are connected to a suitable source of modulation signals to cause one or the other to conduct.

The specific nature of the invention, as well as other objects, aspects, uses and advantages thereof, will clearly appear from the following description and from the accompanying drawing, in which.

Figure 1:
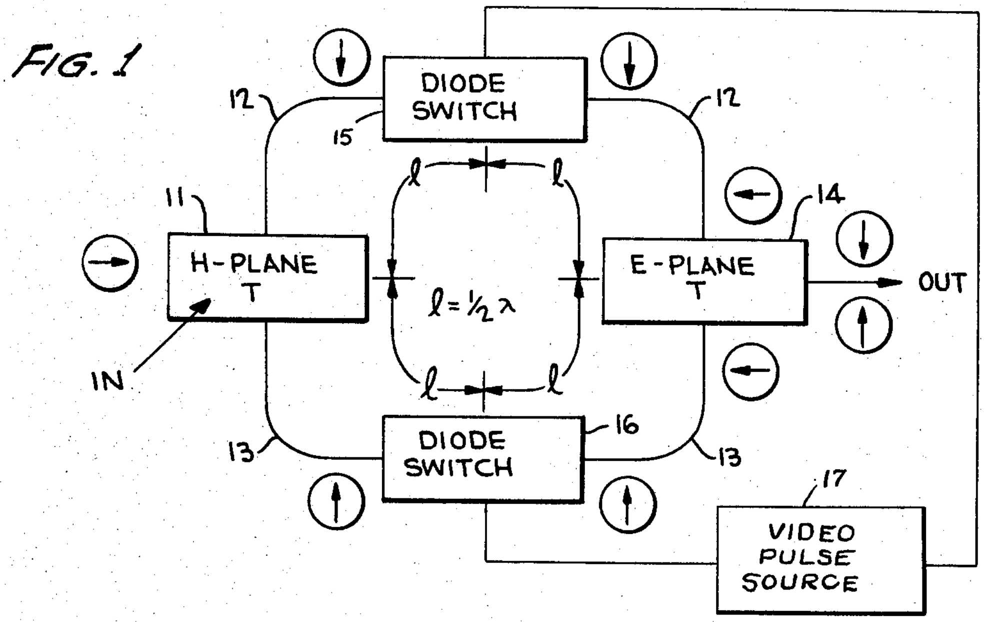
FIG. 1 is a diagram of a two-path wave guide circuit according to the invention which provides 180° phase modulation.

As shown in FIG. 1 of the drawings a preferred embodiment of the binary phase modulator according to the invention comprises an H-plane T network 11 which couples input electromagnetic energy to two energy transmission paths 12 and 13. Transmission paths 12 and 13 are in fact rectangular wave guides and are each equal in length to one wavelength of the input signal. An E-plane T network 14 joins the transmission paths 12 and 13 and couples the electromagnetic energy therein to suitable utilization circuitry (not shown). Diode switches 15 and 16 are inserted in transmission paths 12 and 13, respectively, at points one half wavelength distant from the H-plane T network 11. A suitable video pulse source 17 is connected to diode switches 15 and 16 to alternately cause one or the other to conduct.

The operation of the binary phase modulator shown in FIG. 1 may best be understood by the following examples. First, assume that diode 15 is "off," i.e. it is a short circuit, and that diode 16 is "on," i.e. it is an open circuit. Diode 15 thus presents a short circuit across the wave guide represented by transmission path 12. This short circuit is transformed by the half-wavelength path to appear as a short circuit at the junction of transmission path 12 with H-plane T network 11. As a result, all the energy that is put into the H-plane T network 11 goes into transmission path 13 with minimum loss. The short circuit presented by diode 15 also appears as a short circuit at the junction of transmission path 12 and E-plane T network 14; therefore, the energy in transmission path 13 is coupled to the output of network 14 with minimum loss. Alternatively, if diode switch 15 is "on" and diode switch 16 is "off," energy entering the H-plane T network 11 goes through transmission path 12 and out of the E-plane T network 14. There is, however, one important difference, and that relates to the orientation of the E-field vector. In FIG. 1 the orientation of the E-field vector at various points in the binary phase modulator is represented by the arrows in the circles. From the figure it may be seen that the E-field vector of energy in transmission path 12 is shifted 180° with respect to the E-field vector of energy in transmission path 13. It is to be noted that this relationship of the orientation of the E-field vector in the two transmission paths is substantially independent of frequency. Thus, switching from one transmission path to the other by alternately causing one or the other diode switch to conduct produces binary phase or pulse modulation. The switching can be accomplished very fast and with a minimum of modulating power as determined only by the characteristics of the particular switching diode used. The switching diodes also determine the maximum power of the signal to be modulated.

Figure 2:
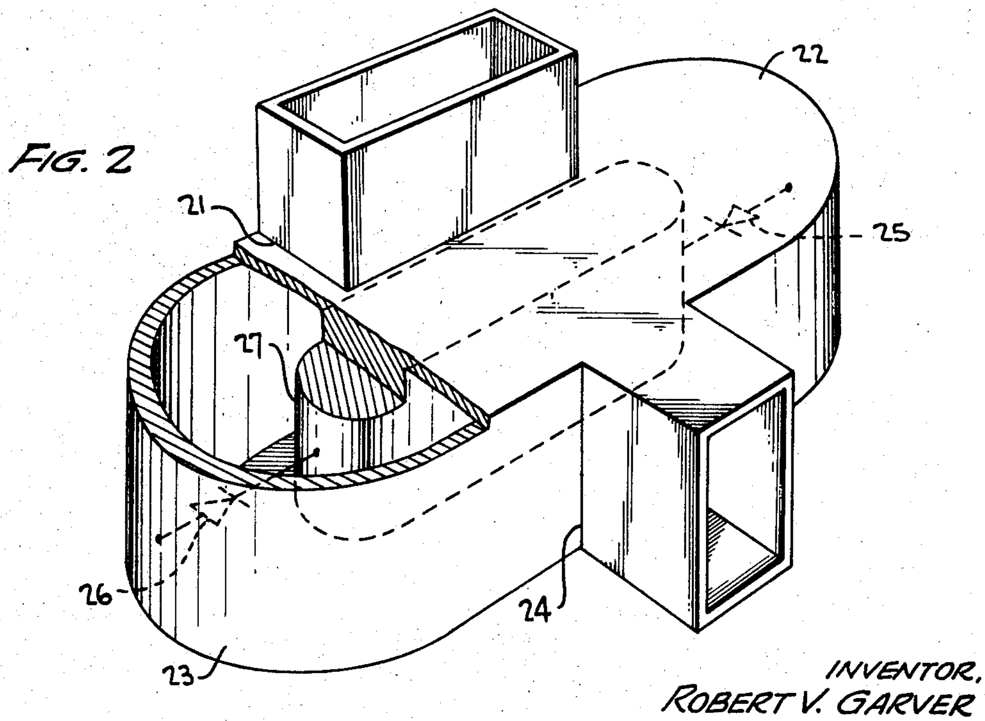
FIG. 2 is a perspective view of the structure shown diagrammatically in FIG. 1.

FIG. 2 illustrates the physical structure of the binary phase modulator shown in FIG. 1. The H-plane T network comprises an H-plane T junction 21 of rectangular wave guide. The energy transmission paths are the rectangular wave guides 22 and 23 which form the arms of T junction 21. The wave guides 22 and 23 bend around a central core 27 and join in an E-plane T junction 24 of rectangular wave guide which corresponds to the E-plane T network shown in FIG. 1. At points one-half wavelength distant from the T junction 21, diodes 25 and 26, here illustrated schematically, are connected across the narrow dimension of wave guides 22 and 23, respectively. As may be appreciated from an examination of FIG. 2, the preferred structure of a binary phase modulator according to the instant invention is very compact and extremely simple. As a matter of fact, the entire microwave structure excluding the switching diodes and their associated circuitry may be cast in one step as one unitary structure by well known casting techniques. Not only do these techniques simplify production of the microwave structure, they also permit substantial economies which result in low cost per unit.

Figure 3:
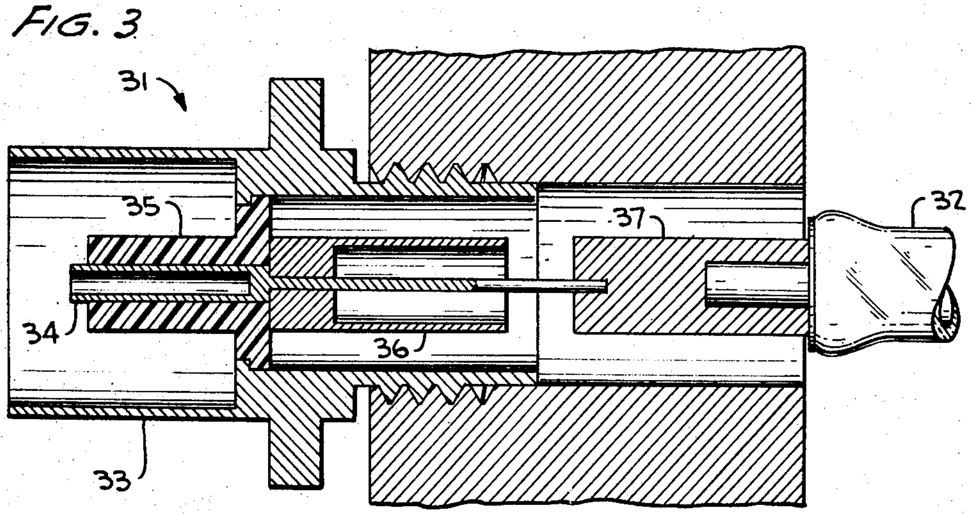
FIG. 3 is a cross-sectional view of the coaxial connector and choke assembly which is used in the structure shown in FIG. 2 for coupling the modulation signals to the diode switches.

The switching diodes are physically connected in the microwave circuitry by the structure shown in FIG. 3. This structure includes a coaxial connector 31 which permits connecting a pulse modulation signal to the switching diode 32. Connector 31 comprises an outer shell 33 a portion of which is threaded for screw engagement in the wall of the wave guide. A central terminal 34 is coaxially supported midway along the length of the shell 33 by an insulating washer 35. The central terminal 34 projects some distance beyond washer 35 toward the switching diode 32. The projection of terminal 34 supports and forms a part of a microwave filter network which provides RF isolation of the modulating video signal. This filter network comprises a cylindrical shell 36 which is coaxially supported on terminal 34 by a solid base at one end of the shell 36 through which terminal 34 projects. The base of cylindrical shell 36 abuts washer 35 and is soldered to terminal 34. A solid cylinder 37 having the same diameter as cylindrical shell 36 is axially aligned therewith but spaced apart therefrom and is soldered to the end of terminal 34. A recess is provided in the end of cylinder 37 opposite terminal 34 for accepting one terminal of diode 32. The other terminal of diode 32 engages a recess (not shown) in the central core of the microwave structure. Cylindrical shell 36 and solid cylinder 37 are each one-quarter of a wavelength of the RF energy long. The distance between the interior surface of the base of cylindrical shell 36 and the end of cylinder 37 is also one-quarter of a wavelength of the RF energy.

Figure 4:
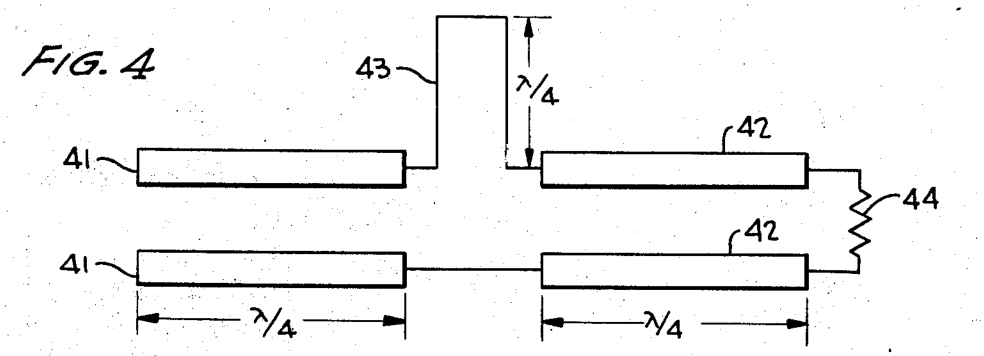
FIG. 4 is a schematic diagram of a transmission line equivalent circuit of the assembly shown in FIG. 3.

The RF equivalent circuit of the microwave filter network shown in FIG. 3 is illustrated in FIG. 4 as comprising two low impedance transmission line segments 41 and 42 each one-quarter of a wavelength long joined by a higher impedance shorted quarter-wavelength stub 43. Transmission line segment 42 is terminated in the diode RF impedance 44. The shorted stub 43 appears as an open circuit at the junction of transmission line segments 41 and 42. This in turn appears as a short circuit at the input of transmission line segment 41 thus effectively isolating the RF energy from the modulation signal source. The shorted stub 43 also appears as an RF short circuit at the junction of transmission line segment 42 and diode impedance 44 thereby permitting only a minimum interaction of the RF signal with the switching of the diode.

Figure 5:
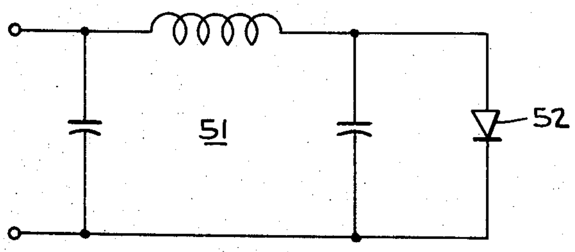
FIG. 5 is a schematic diagram of a lumped constant equivalent circuit at modulation frequencies of the assembly shown in FIG. 3.

At video modulation frequencies the filter network elements shown in FIG. 3 are considerably less than one-quarter of a wavelength. An approximate equivalent circuit of the filter at video frequencies is shown in FIG. 5. This simply comprises a low-pass pi network 51 having a characteristic impedance equal to the impedance of the source of modulation signals which is connected across the switching diode 52. The network 51 thus provides a relatively low impedance connection between the source of modulating signals and the switching diode.

It will be apparent that the embodiment shown is only exemplary and that various modifications can be made in construction and arrangement within the scope of the invention as defined in the appended claims.

I claim as my invention:

1. A reciprocal microwave binary phase modulator comprising:
   (a) a first transmssion path equal in length to an integral number of wavelengths of the signal to be modulated;
   (b) a second transmission path equal in length to an integral number of wavelengths of the signal to be modulated;
   (c) an H-plane T network means connected to one end of said first and second transmission paths for coupling input signal energy into said first and second transmission paths;
   (d) an E-plane T network means connected to the ends of said first and second transmission paths remote from said H-plane T network means for coupling energy out of either said first or said second transmission paths; and
   (e) means connected to said first and second transmission paths for preventing transmission of signal energy in one or the other of said first and second transmission paths, whereby pulse modulation of the signal energy is obtained by alternately preventing transmission of the signal energy in one or the other of said first and second transmission paths thereby causing the E-field of the output signal energy to be alternately shifted in phase by 180°.

2. A microwave binary phase modulator as defined in claim 1 wherein said first transmission path comprises a first rectangular wave guide, said second transmission path comprises a second rectangular wave guide, said H-plane T network means comprises an H-plane T junction of which said first and second rectangular wave guides form the arms, and said E-plane T network means comprises an E-plane T junction of which said first and second rectangular wave guides form the arms.

3. A microwave binary phase modulator as defined in claim 2 wherein said means for preventing transmission of signal energy in one or the other of said first and second transmission paths comprises:
   (a) first diode switch means connected across the narrow dimension of said first rectangular wave guide at a point an integral number of half-wavelengths distant from said H-plane T junction for causing a short circuit across said first rectangular wave guide when biased into conduction by a modulation pulse; and (b) second diode switch means connected across the narrow dimension of said second rectangular wave guide at a point an integral number of half-wave-lengths distant from said H-plane T junction for causing a short circuit across said second rectangular wave guide when biased into conduction by a modulation pulse.

4. A microwave binary phase modulator as defined in claim 3 further comprising:

(a) first filter means connected to said first diode switch means for isolating the modulation signal from the signal to be modulated; and (b) second filter means connected to said second diode switch means for isolating the modulation signal from the signal to be modulated.

References Cited

UNITED STATES PATENTS

| | | | |
|---|---|---|---|
| 2,468,237 | 1/1949 | Sanders et al. | 332—43 |
| 2,496,521 | 2/1950 | Dicke | 332—45 |
| 2,593,120 | 4/1952 | Dicke | 333—7 X |
| 2,628,308 | 2/1953 | Norton | 325—446 |
| 2,629,772 | 2/1953 | Ring | 333—7 X |
| 2,679,582 | 2/1954 | Edwards | 332—43 X |

ALFRED L. BRODY, *Primary Examiner.*